April 28, 1936.  R. G. LA FOUNTAIN  2,038,943
VALVE CONTROL
Filed Feb. 3, 1934  2 Sheets—Sheet 1
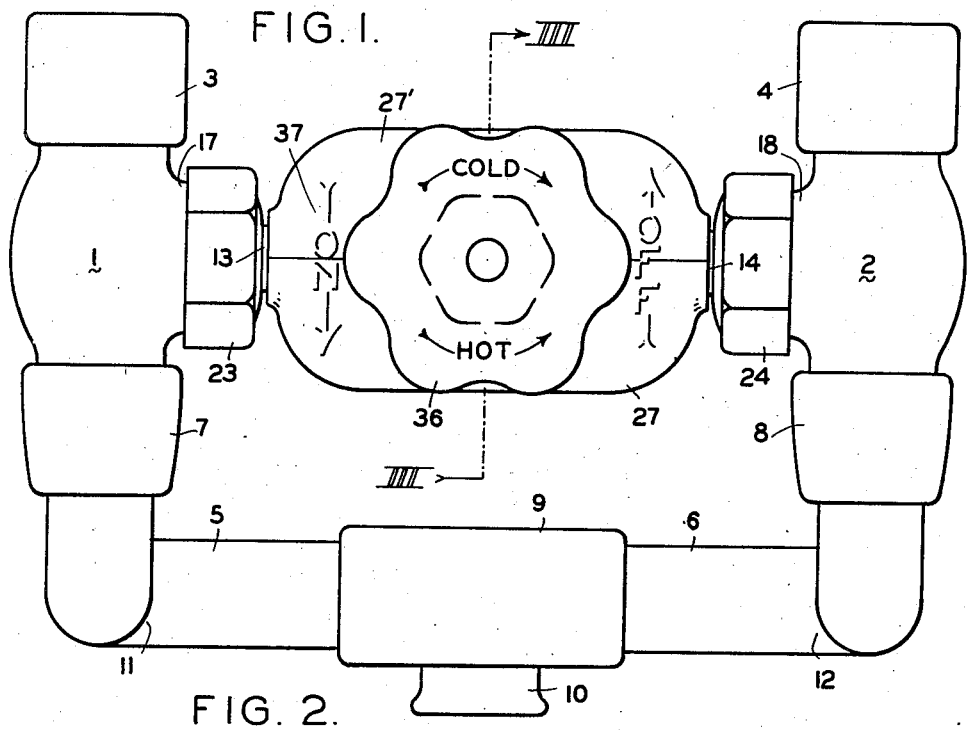
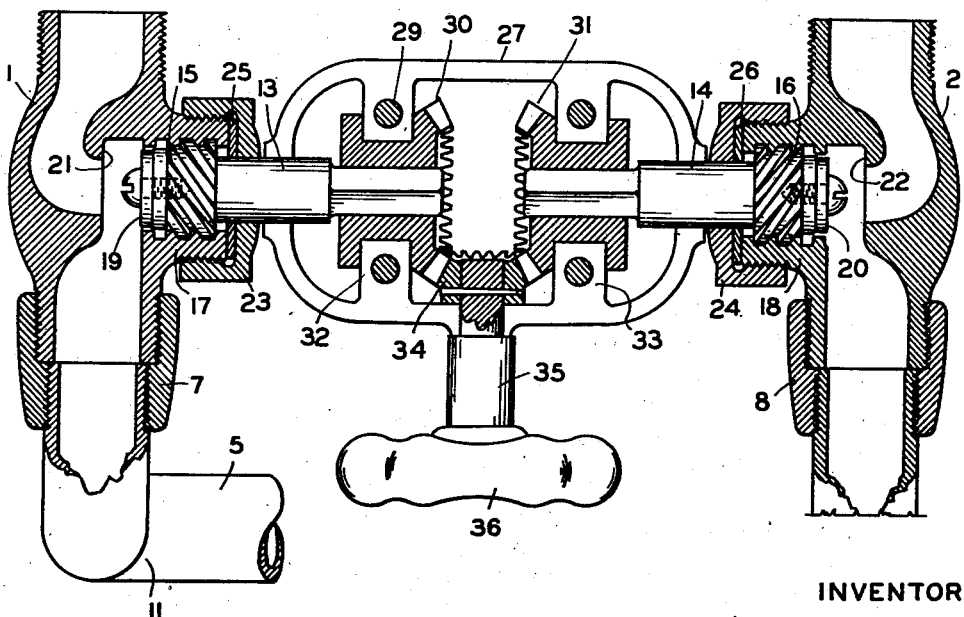
INVENTOR:
RICHARD G. LA FOUNTAIN
BY
ATTORNEY April 28, 1936.  R. G. LA FOUNTAIN  2,038,943
VALVE CONTROL
Filed Feb. 3, 1934  2 Sheets-Sheet 2

INVENTOR:
RICHARD G. LA FOUNTAIN
BY
ATTORNEY

Patented Apr. 28, 1936

2,038,943

UNITED STATES PATENT OFFICE 2,038,943

VALVE CONTROL

Richard G. La Fountain, San Francisco, Calif.

Application February 3, 1934, Serial No. 709,619

4 Claims. (Cl. 277—18)

This invention relates to valve controls and more particularly to controls for mixing valves.

The principal object of the present invention is to provide a single control for regulating both the volume delivered and the proportions of the mixture.

Another object is to permit the operation of either of the valves without disturbing the other.

Another object is to provide convenient means, simple of operation, for delivering water of controlled temperature.

Another object is to provide a sightly, attractive, plumbing fixture susceptible of adaptation to varying ornamental designs.

Another object is to render the valves readily accessible for repairs.

Other objects and advantages appear as this description progresses.

In this specification and the accompanying drawings, the invention is disclosed in its preferred form. It is to be understood, however, that it is not limited to this form because it may be embodied in other forms without departing from the spirit of the invention as defined in the claims following the description.

In the two sheets of drawings:

Fig. 1 is a plan view of a mixing valve constructed in accordance with this invention.

Fig. 2 is a horizontal section of the same with both valves open.

Figure 3:
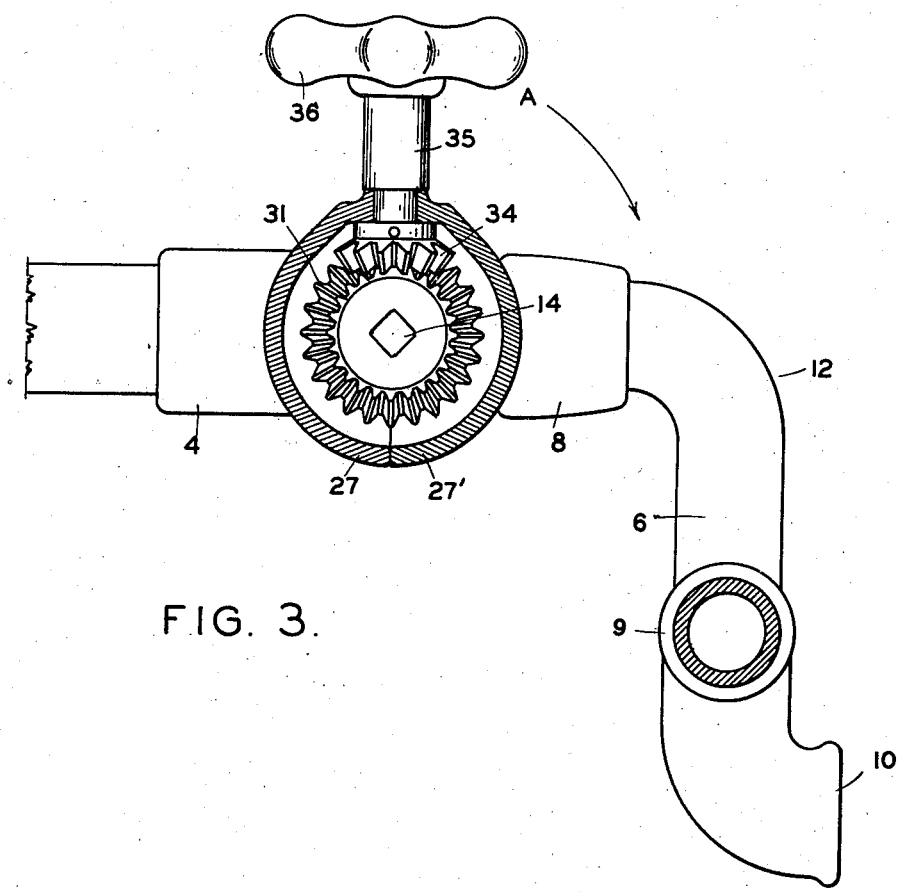
Fig. 3 is a longitudinal section of the same taken on the line III—III in Fig. 1 with the control in the "off" position.

In detail, the construction illustrated in the drawings, referring more particularly to Figs. 1 and 2, comprises the valves 1 and 2 having the unions 3 and 4 screwed thereon to connect the valves to the hot and cold water service lines respectively. The tubes 5 and 6 are connected to the opposite ends of the valves 1 and 2 by the unions 7 and 8 and are joined together by the T connection 9 which may have the depending spout 10. The tubes 5 and 6 are bent downward at 11 and 12 to provide space for the operation of the valve control as hereinafter described.

The valves 1 and 2 have the opposed stems 13 and 14 disposed toward each other and having the multiple square threads 15 and 16 thereon screwed into the necks 17 and 18 of the valves. The inner ends of the valve stems have the washers 19 and 20 secured thereto and adapted to cooperate with the valve seats 21 and 22 respectively to close the valves. The multiple threads 15 and 16 are arranged so that a fraction of a turn of the stems 13 and 14 is sufficient to open the valves.

The hexagonal caps 23 and 24 threaded on the necks 17 and 18 serve as guides for the valve stems 13 and 14. The packing washers 25 and 26 compressed between the caps 23, 24 and the ends of the necks 17, 18 seal the valve stems to prevent incidental leakage past the caps.

The control unit comprises the hollow semi-cylindrical members 27 and 27' (see also Fig. 3) which are secured together by screws such as 29 to form an enclosing casing having its ends rotatably engaging the valve stems 13 and 14. The opposed bevel gears 30 and 31 slidably engage the squared ends of the stems 13 and 14 and have their hubs swivelled in the annular lugs 32 and 33 within the casing. The sub shaft 35 projects through the casing at the junction of the two halves 27 and 27' thereof. The bevel pinion 34 is pinned on the shaft 35 and is enmeshed with the opposed bevel gears 30 and 31. The convenient operating handle of porcelain 36, or of other suitable material is fixed on the outer end of the stub shaft 35 for rotating the bevel pinion 34.

The invention operates substantially as follows: To open the valves, the handle 36 is first pulled forward in the direction of the arrow A in Fig. 3. The suitable legends 37 on the casing indicate the direction of this movement. The bending of the connected tubes 5 and 6 downward at 11 and 12 provides space for the accommodation of the handle 36 when pulled forward.

The forward movement of the handle partially rotates the casing 27 on the axis of the valve stems 13 and 14. The bevel gears 30 and 31 are thus also rotated both in the same direction by reason of their engagement with the stationary pinion 34. This turns the valve stems 13 and 14 upon the squared ends of which the bevel gears 30, 31 are slidably mounted.

The multiple threads 15 and 16 cooperating with similar threads in the necks 17 and 18 move the stems 13, 14 longitudinally to unseat the valve washers 19 and 20, as illustrated in Fig. 2. The opposed spirals are threaded in reverse directions in order that the above described movement opens both the valves. The slidable engagement of the squared ends of the valve stems 13, 14 with the bevel gears 30, 31 permits their necessary longitudinal movement therein. The annular lugs 32 and 33 retain the bevel gears in a fixed longitudinal plane.

The volume of water delivered from the spout 10 may be accurately regulated by varying the distance the handle 36 is pulled forward.

The above preliminary forward movement of the handle opens both the valves 1 and 2 to an equal extent. The proportions of the mixture and consequent temperature of the water may then be controlled by rotating the handle 36. Appropriate legends on the handle indicate the directions necessary to rotate the handle to effect a desired water temperature.

The rotation of the bevel pinion 34 drives the opposed gears 30 and 31 in opposite directions. The threads 15 and 16 then operate to partially close one of the valves 1 or 2 as desired and to open the other valve still wider.

The valves are closed by raising the handle 36 into the "off" position and synchronously rotating the handle back to its original radial position. This operation reverses the movements hereinbefore described and turns the stems 13 and 14 to seat both of the valve washers 19 and 20.

When the valves 1 and 2 are both closed, either valve can be opened without disturbing the other by turning the handle 36 in the desired direction as indicated by the arrows thereon. The bevel pinion 34 exerts a torsion against one of the bevel gears to more tightly close the valve it controls. The pinion then utilizes the stationary gear as a rack, revolving around its periphery and rotating the opposite bevel gear. The casing 27 slightly rotates on the stems 13, 14 to allow the pinion 34 the necessary revolutionary movement. The rotation of either of the bevel gears unseats its associated valve washer to the desired extent. The opened valve may be closed by reversing the movement of the handle.

The control unit may be easily dismantled for repairs such as replacing leaky valve washers. The screws 29 are first removed to disassemble the two halves 27 and 27' of the casing. The stub shaft 35, projecting at the junction of the two halves of the casing, is removed therewith. The bevel gears 30 and 31 are then individually slipped off the squared ends of the valve stems 13 and 14. The valves 1 and 2 are then fully accessible and may be repaired in the usual manner by unscrewing the caps 23, 24 and withdrawing the valve stems 13 and 14.

Having thus described the invention, what is claimed and desired to be secured by Letters Patent is:

1. In combination with a pair of valves having opposed operating stems; driven members on said stems; a driving member interposed between said driven members; and a handle arranged to revolve said driving member around the axis of said stems and/or to rotate said driving member.

2. In combination with a pair of valves having opposed operating stems; a casing enclosing said stems; driven members on said stems; a driving member interposed between said driven members; and mounted in said casing and having its axis perpendicular to said stems; and a handle adapted to revolve said driving member around the axis of said stems and/or to rotate said driving member.

3. In combination with a pair of valves having opposed operating stems; a casing enclosing said stems and rotatable thereon; bevel gears within said casing and slidably engaging said stems; a bevel pinion mounted in said casing and enmeshed with said bevel gears; and a handle arranged to rotate said casing on said stems and/or to rotate said pinion.

4. In combination with a pair of valves having opposed operating stems; a casing enclosing said stems; bevel gears within said casing and slidably engaging said stems; a bevel pinion mounted in said casing and enmeshed with said bevel gears; and a control handle adapted to drive said pinion.

RICHARD G. LA FOUNTAIN.